United States Patent
Nakao et al.

(10) Patent No.: US 9,666,150 B2
(45) Date of Patent: May 30, 2017

(54) DISPLAY DEVICE

(71) Applicant: Japan Display Inc., Tokyo (JP)

(72) Inventors: Kenji Nakao, Tokyo (JP); Yukio Tanaka, Tokyo (JP); Daiichi Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 58 days.

(21) Appl. No.: 14/564,142

(22) Filed: Dec. 9, 2014

(65) Prior Publication Data

US 2015/0161966 A1    Jun. 11, 2015

(30) Foreign Application Priority Data

Dec. 9, 2013   (JP) .................. 2013-254207

(51) Int. Cl.
  *G09G 3/3233*  (2016.01)
  *G09G 3/36*    (2006.01)
  *G02F 1/1362*  (2006.01)
  *G09G 3/3225*  (2016.01)

(52) U.S. Cl.
  CPC ..... *G09G 3/3648* (2013.01); *G02F 1/136286* (2013.01); *G09G 3/3225* (2013.01); *G09G 2300/08* (2013.01); *G09G 2320/0214* (2013.01); *G09G 2320/0233* (2013.01); *G09G 2320/0247* (2013.01)

(58) Field of Classification Search
  CPC ........ G09G 3/3233; G09G 3/325; G09G 3/02; G09G 2300/0452; G09G 3/3252; G09G 3/3648
  See application file for complete search history.

(56) References Cited

U.S. PATENT DOCUMENTS

| 5,982,462 | A | 11/1999 | Nakano et al. | |
|---|---|---|---|---|
| 2005/0104875 | A1* | 5/2005 | Kwak | G09G 3/3233 345/204 |
| 2006/0138420 | A1* | 6/2006 | Shibusawa | G09G 3/325 257/59 |
| 2011/0012105 | A1* | 1/2011 | Yamazaki | H01L 27/1251 257/43 |
| 2013/0034199 | A1* | 2/2013 | Toyotaka | G11C 19/28 377/75 |
| 2013/0075711 | A1* | 3/2013 | Kanegae | H01L 27/3248 257/40 |

FOREIGN PATENT DOCUMENTS

JP    3402909 B2    2/2003

* cited by examiner

*Primary Examiner* — Ricardo L Osorio
(74) *Attorney, Agent, or Firm* — TYPHA IP LLC (57) ABSTRACT

A high-precision display device is capable of suppressing a leak current and operating at a low power consumption. The display device comprises a source power supply for providing a pixel electric potential to each pixel placed on a substrate through a first thin-film transistor; a gate power supply for controlling conductive and nonconductive states of the first thin-film transistor; and a second thin-film transistor disposed between the first thin-film transistor and the gate power supply, the second thin-film transistor being controllable independently of the first thin-film transistor.

5 Claims, 8 Drawing Sheets

DISPLAY DEVICE

CLAIM OF PRIORITY

The present application claims priority from Japanese patent application JP2013-254207 filed on Dec. 9, 2013, the content of which is hereby incorporated by reference into this application.

BACKGROUND

The present invention relates to a display device. In particular, the present invention relates to a display device adopting an active-matrix method.

A liquid-crystal display device is generally a liquid-crystal display device adopting an active-matrix method, which has a thin-film transistor (hereinafter, also abbreviated as "TFT") functioning as a pixel transistor, for each of pixels which are laid out to form a matrix. The pixel TFT holds display electric charge when put in an open state or an electrically disconnected state.

To use a mobile phone or a smart phone for a long period of time, the phone is required to have a liquid-crystal panel consuming a small amount of power. An ordinary liquid-crystal panel carries out write operations at a frequency of 60 times per second. The amount of power consumed for driving the write operations cannot be ignored. In operations to display mails, web pages or the like, the displays appearing on the panel are mostly static displays. Thus, the write operations do not have to be carried out at a frequency of 60 times per second. Therefore, the panel is different from for example a TV for displaying moving images. In addition, it is possible to assume a device in which the display mode is switched from a moving image mode to a static image mode and vice versa. The moving image mode is a mode for displaying 60 comas per second whereas the static image mode is a mode for carrying out intermittent driving and holding the previous image in the mean time. To reduce the driving power, reducing the driving frequency, e.g. carrying out a writing operation only once per second, is effective. However, the human eye has an unfavorable sensitivity for luminance changes of a low frequency. Thus, if the luminance is not prevented from changing before and after the write operation, flickering is generated, causing the user to feel discomfort. In general, the human eye is not capable of recognizing flickering of a frequency of 60 Hz or higher. Thus, there is no problem even if the luminance changes. For a frequency lower than 60 Hz, however, the luminance changes must be kept at a value smaller than a recognition limit.

As described above, in the case of an active-matrix liquid-crystal display device, a TFT is provided for each of pixels laid out to form a matrix and, in a post-write period for holding data, pixel electrode charge is held by putting the TFTs in an open state or an electrically disconnected state. If the off characteristic of the pixel TFT is poor, the electric charge leaks out during the data holding period. Thus, the voltage after the data holding period is different from the initial value so that the luminance changes. As a result, there appears a phenomenon in which the luminance changes when a write operation is carried out again. The off characteristic, showing the length of a period in which electric charge can be held reliably during the data holding period, is an important parameter.

In addition, in recent years, there has also been announced an active-matrix liquid-crystal display device made by using an oxide semiconductor to provide a small off current as a characteristic. In general, however, the TFT of a high-precision active-matrix liquid-crystal display device such as that used in a smart phone is a low-temperature poly-silicon TFT in many cases. This is because there are merits that the size of the TFT can be reduced and a logic circuit such as a scanning circuit can be created. Also in the future, the TFT of a high-precision active-matrix liquid-crystal display device is a low-temperature poly-silicon TFT in many cases. According to studies made by inventors of the present invention, however, if the intermittent driving is carried out by using this low-temperature poly-silicon TFT, there are raised problems that the luminance changes are big and easily recognized as display flickers.

SUMMARY

Japanese Patent No. 3402909 discloses a method for reducing a leak current by applying capacitance connections to gates. In accordance with this method, an intermediate electrode is created so that effective capacitors are connected in series. Thus, the capacitance of each gate can be reduced. If a low-temperature poly-silicon TFT is used, however, in the intermittent driving, the reducer of the leak current is not sufficient.

It is thus an object or the present invention to provide a display device which uses a low-temperature poly-silicon TFT and serves as a high-precision display device capable of reducing a leak current with a small amount of consumed power during intermittent driving.

To solve the problems described above, an embodiment of the present invention provides a display device including: a source power supply for providing a pixel electric potential to each pixel placed on a substrate through a first thin-film transistor; a gate power supply for controlling the conductive and nonconductive states of the first thin-film transistor; and a second thin-film transistor disposed between the first thin-film transistor and the gate power supply, the second thin-film transistor being controllable independently of the first thin-film transistor.

In addition, another embodiment of the present invention provides a display device including: a source power supply group for providing a pixel electric potential to a plurality of pixels placed on a substrate to form a matrix, through a first thin-film transistor; a gate power supply group for controlling the conductive and nonconductive states of the first thin-film transistor; and a second thin-film transistor disposed between the first thin-film transistor and the gate power supply, the second thin-film transistor being controllable independently of the first thin-film transistor.

DESCRIPTION OF THE PREFERRED EMBODIMENTS

The following description explains embodiments of the present invention by referring to the diagrams as follows. It is to be noted that the following description is no more than a typical disclosure. Proper changes easily thought of by a person skilled in the art as changes made by maintaining essentials of the present invention are naturally considered to be changes included in the scope of the present invention. In addition, the diagrams are provided to make the description easier to understand. Thus, the width, thickness, shape and so on of each section may be expressed as a model in comparison with the actual embodiments. That is to say, the diagrams are also typical diagrams which do not limit interpretations of the present invention. In addition, in the specification and the diagrams, an element identical with an element explained before in the specification by referring to the diagrams is denoted by the same reference numeral as the explained element so that the explanation of the identical element can be omitted in some cases.

First Embodiment

Figure 5:
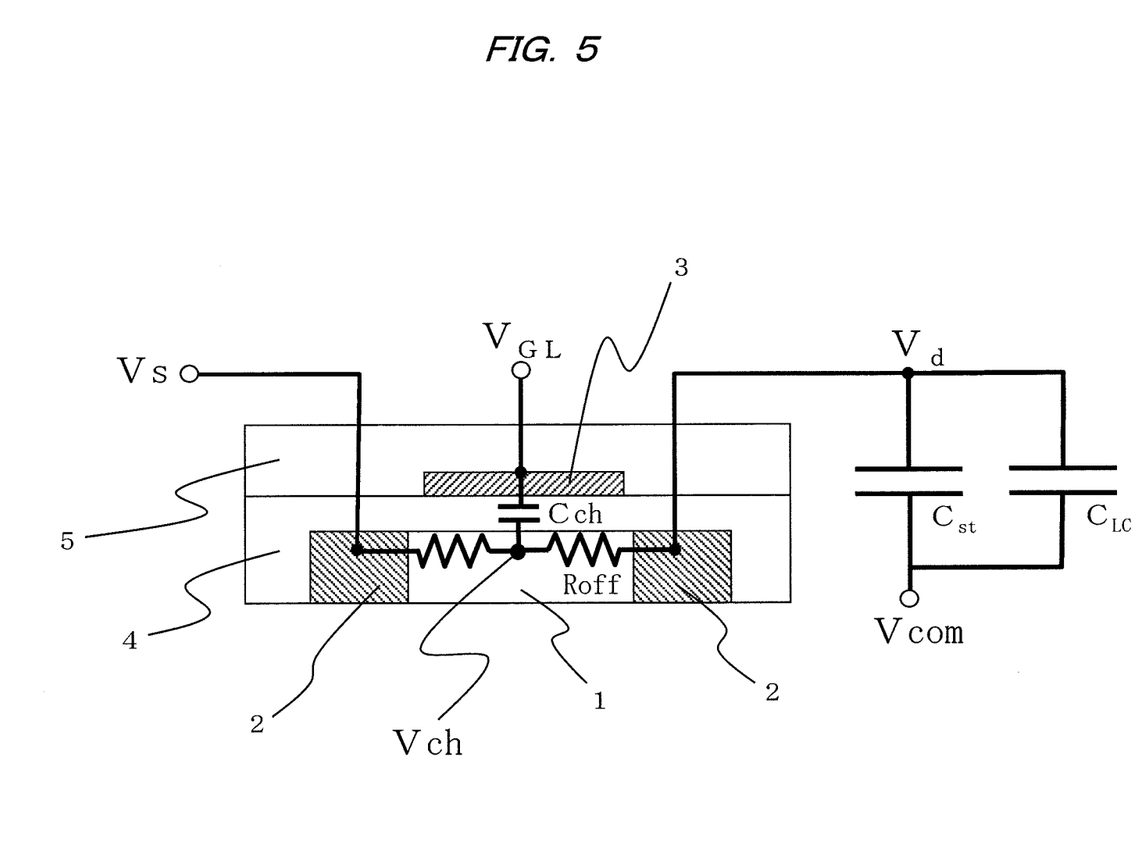
FIG. 5 is a diagram schematically showing the configuration of a typical liquid-crystal display device.

To explain the principle of the present invention, FIG. 5 is provided as a diagram schematically showing the structure of a pixel of a typical active-matrix liquid-crystal display device using low-temperature silicon. In the structure of a pixel of a typical active-matrix liquid-crystal display device, electric charge is accumulated in a pixel capacitor (comprising mainly an auxiliary capacitor $C_{st}$ and a liquid-crystal capacitor $C_{LC}$). A pixel TFT comprising sections 1 to 5 controls operations to accumulate and hold electric charge in the pixel capacitor. $V_{GL}$ is connected to a gate line for controlling the on and off states of this TFT. A source voltage providing an electric potential for charging a pixel electrode is applied to $V_s$. It is to be noted that the opposite side of the pixel capacitor is connected to a common electrode $V_{com}$.

The pixel TFT comprises a channel creation area 1, source-drain areas 2 sandwiching the channel creation area 1 on both sides of the channel creation area 1, a gate electrode 3 created above the channel creation area 1 through a gate insulation film 4, and an insulation film 5 for covering these elements. One of the source-drain areas 2 is connected electrically to the pixel whereas the other source-drain area 2 is connected electrically to a member for supplying a signal-line electric potential $V_s$. As will be described later, for the sake of the convenience of the explanation, a capacitor existing between the gate electrode 3 and the channel creation area 1 is used as a gate-electrode/channel capacitor $C_{ch}$. In addition, with the pixel TFT put in an open state or an electrically disconnected state, the resistance of a resistor between the source-drain areas 2 is defined as an off resistance $R_{off}$.

Figure 6:
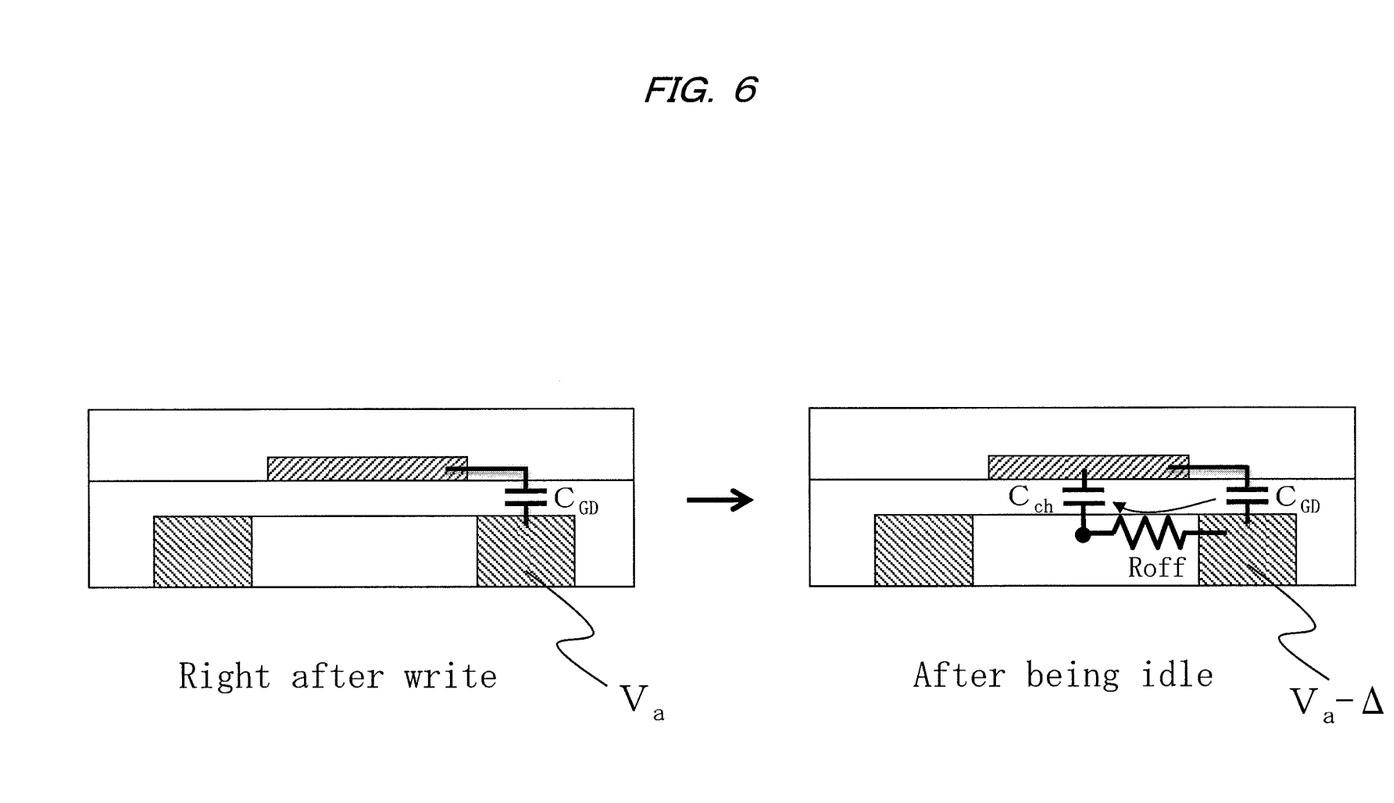
FIG. 6 is a diagram schematically showing problems of a typical liquid-crystal display device.
Figures 7, 8:
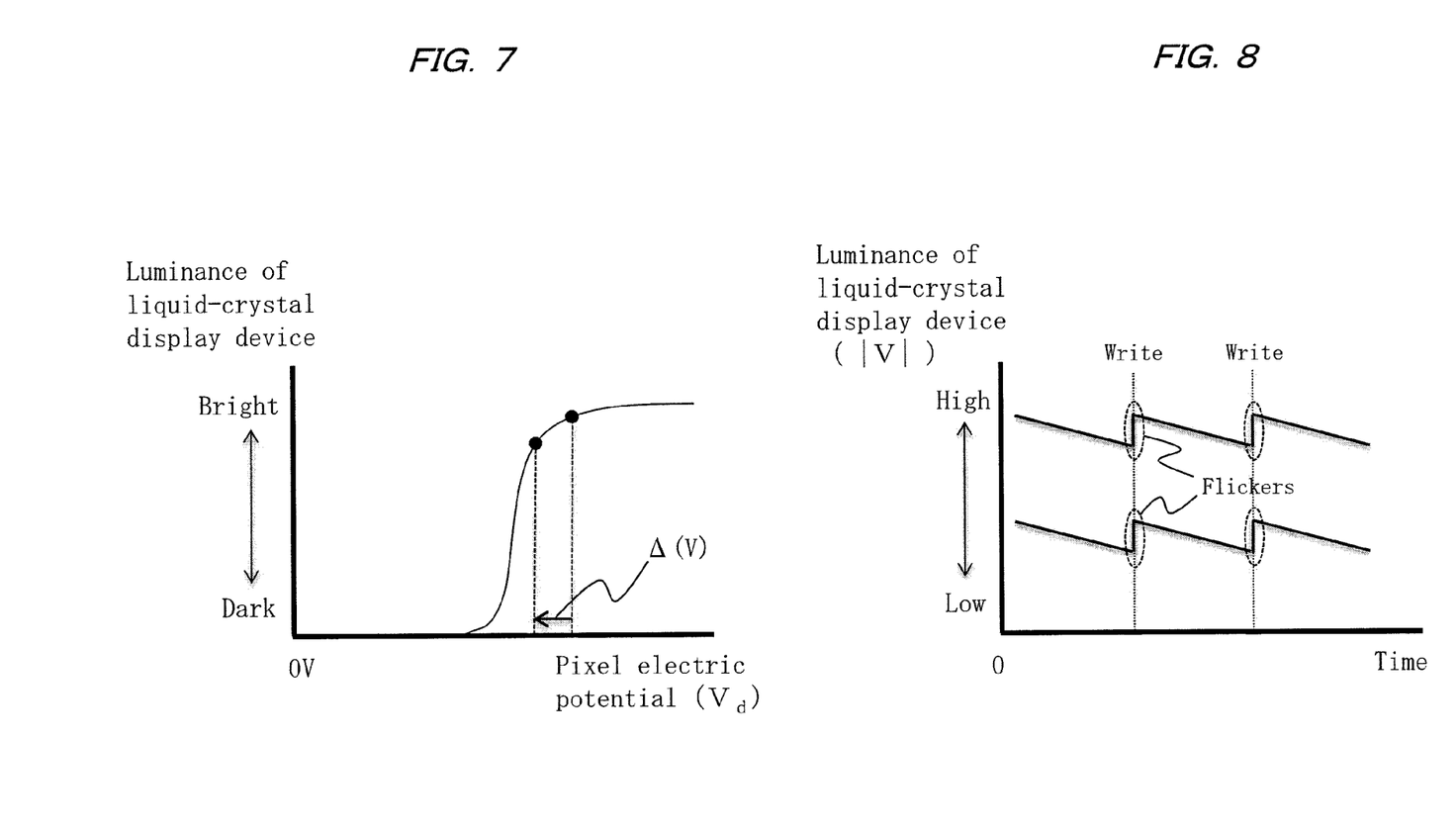
FIG. 7 is a diagram schematically showing problems of a typical liquid-crystal display device.
FIG. 8 is a diagram schematically showing problems of a typical liquid-crystal display device.

FIGS. 6, 7, 8 are diagrams schematically showing problems of a typical liquid-crystal display device. In the case of an active-matrix liquid-crystal display device, pixel electrode charge is held by putting the TFTs in an open state after writing into the pixel. The holding period in the ordinary device is 1/60 second in many cases. When an intermittent driving is carried out, it is important to make the holding period as long as possible.

As shown in FIG. 6, after electric charge has been accumulated in the pixel by putting the pixel TFT in a close state, that is, an electrically connected state, the TFT is put in an open state. In this case, if intermittent driving is carried out by using a low-temperature liquid-crystal display device, there is raised a problem that luminance changes are generated. This is because the pixel charge decreases due to a leak current caused by an off current. Since the poly silicon has a crystal property stronger than the amorphous silicon, the off characteristic is poor, causing a shortcoming that a leak current can flow with ease.

That is to say, as shown in FIG. 6, after electric charge has been accumulated in the pixel in a write operation, if the pixel is left as it is in an idle state for a fixed period of time, there is raised a problem that the electric charge leaks to the side of the capacitor $C_{ch}$ between the gate electrode and the channel through the off resistor $R_{off}$. As a result of the leaking of the electric charge, the pixel electric potential decreases from Va to (Va−Δ). The problem is caused by the leaking of the electric charge on the pixel electrode. The most basic mode is a mode in which the electric charge leaks through a resistor to get out from the pixel electrode to the source electrode. This can be adjusted and designed by adoption of a dual-gate structure in the design of a gate line width and in the manufacturing of a semiconductor material. Even if a sufficiently high resistance can be implemented in the leaking phenomenon from the pixel to the source, however, the leak to the capacitor $C_{ch}$ between the gate electrode and the channel may become a problem. This is because the capacitor $C_{ch}$ exists between the gate electrode and the poly-silicon channel so that the charging current cannot be ignored. If electric charge is generated in the poly silicon while the pixel is left as it is in an idle state, the electric charge is accumulated gradually in the capacitor $C_{ch}$ between the gate electrode and the channel. Conceptually, the electric charge is accumulated gradually in the capacitor $C_{ch}$ at a CR time constant determined by $C_{ch}$ and $R_{off}$.

After electric charge has been accumulated in the pixel in a write operation, if the pixel is left as it is in an idle state for a fixed period of time, the electric charge may leak to the side of the capacitor $C_{ch}$ between the gate electrode and the channel through the off resistor $R_{off}$. In this case, as shown in FIG. 7, the luminance of the liquid-crystal display device drops by a decrease corresponding to ΔV which is the decrease of the pixel electric potential. In a display device adopting the active-matrix method, write operations are carried out periodically as shown in FIG. 8. The luminance decreases corresponding to ΔV which is the decrease of the pixel electric potential are recognized as flickers of the display.

In the typical liquid-crystal display device, there may be created a light shielding layer for avoiding incorrect operations of external light. If the amount of light radiated to the poly silicon is reduced due to the light shielding layer, however, it has been known that the time constant further increases. The time constant is about 1 second. If the frequency of the intermittent driving is about 1 Hz, the level becomes a level raising a very big problem. For a 190-fF pixel capacitance including an auxiliary capacitance $C_{st}$, the gate capacitance is 6 fF which is about 3% of the pixel capacitance. Also for such a capacitance, an optical change appears as a change of 20% of the luminance. Thus, in a high-precision display device, a big problem is raised. In order not to recognize luminance changes, it is necessary to suppress the luminance changes to a value not greater than 1.4%. As a method for suppressing the luminance changes, for example, the capacitance $C_{ch}$ between the gate electrode and the channel is reduced. If the capacitance $C_{ch}$ between the gate electrode and the channel is reduced, the leak current to the capacitor $C_{ch}$ can be decreased. Thus, a reduction effect can be expected. Since the capacitance $C_{ch}$ between the gate electrode and the channel is dependent on the minimum value of the gate line width and the thickness of the gate oxide film, however, it is difficult to reduce the capacitance $C_{ch}$ between the gate electrode and the channel to a very small value.

Figure 9:
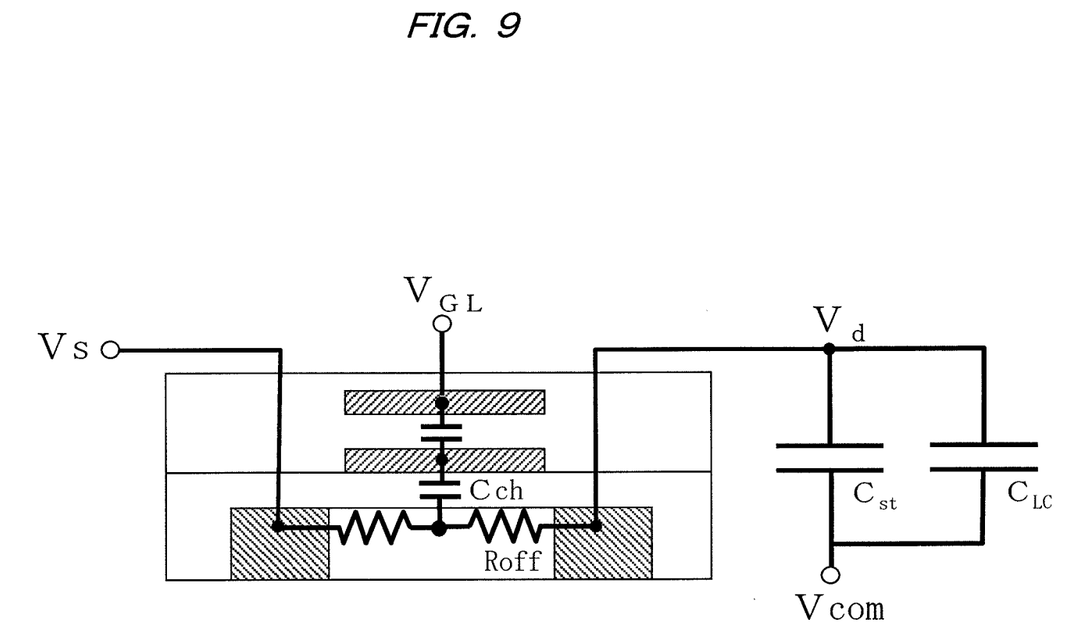
FIG. 9 is a diagram schematically showing the configuration of the conventional liquid-crystal display device.

As means for reducing the capacitance $C_{ch}$ between the gate electrode and the channel, for example, a configuration shown in FIG. 9 is used. The configuration includes a gate of capacitor coupling like one disclosed in Japanese Patent No. 3402909 described earlier. However, this means has a demerit that the aperture rate of the display device is decreased substantially.

Figure 1:
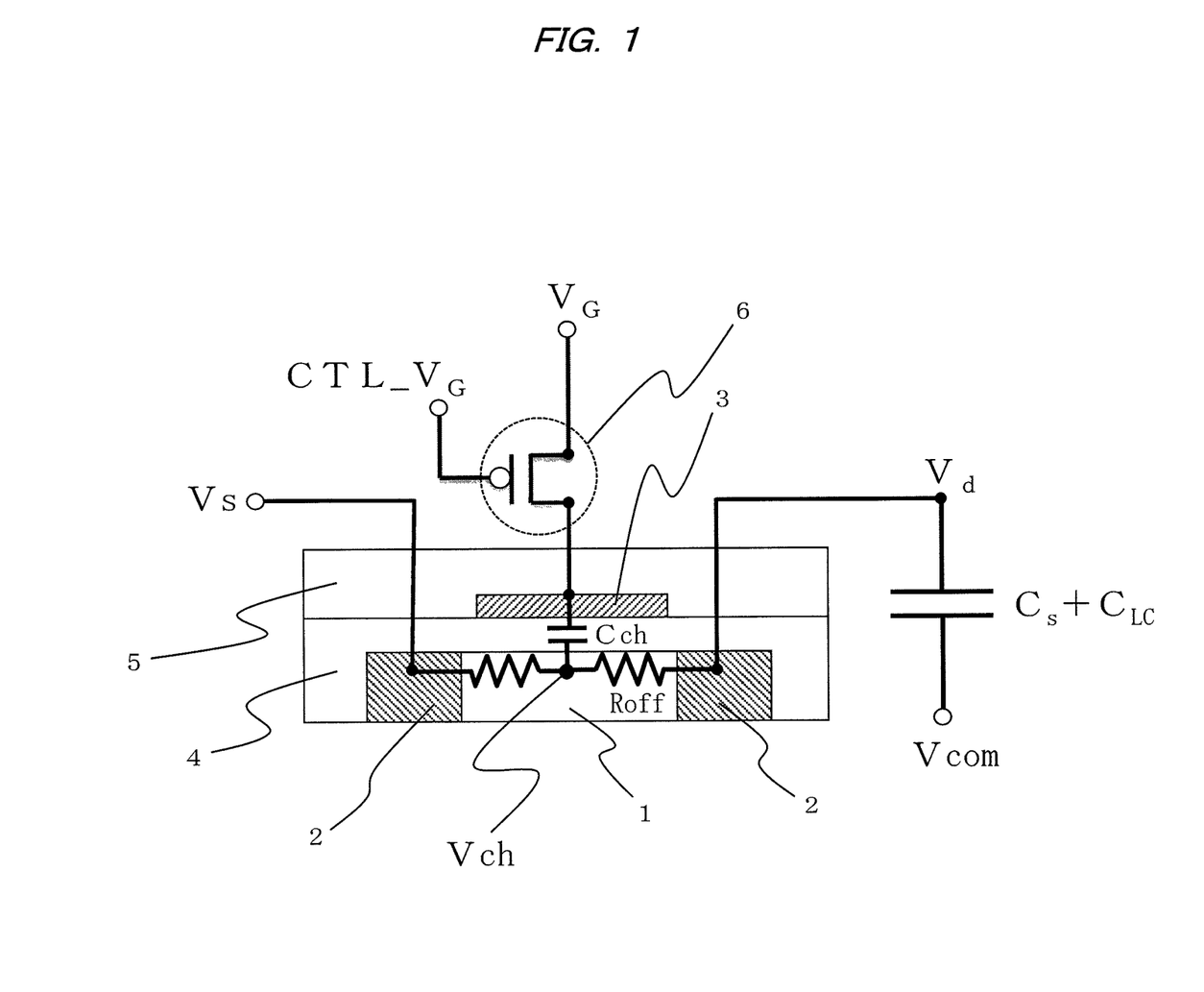
FIG. 1 is a diagram schematically showing the configuration of a display device according to an embodiment of the present invention.

As shown in FIG. 1, the liquid-crystal display device according to an embodiment is a display device including: a source power supply for providing a pixel electric potential to each pixel placed on a substrate through a first thin-film transistor; and a gate power supply for controlling the conductive and nonconductive states of the first thin-film transistor. The display device is characterized in that the device further has a second thin-film transistor between the first thin-film transistor and the gate power supply and that the second thin-film transistor can be controlled independently of the first thin-film transistor.

Sections shown in FIG. 1 but already described earlier by referring to FIG. 5 are not explained again in order to avoid duplications of explanations. As shown in FIG. 6, an A thin-film transistor 6 is provided between a gate power supply $V_G$ and a gate electrode 3 included in a pixel TFT. The A thin-film transistor 6 can be controlled independently of the pixel TFT. During an idle period after electric charge has been accumulated in the pixel, that is, after a write operation has been carried out, a voltage is applied to a control-gate power supply CTL_$V_G$ of the A thin-film transistor 6 in order to put the A thin-film transistor 6 in an open state, that is, an electrically disconnected state. It is thus possible to prevent the electric charge held in the pixel from being again accumulated in a gate-electrode/channel capacitor $C_{ch}$ through a resistor $R_{off}$ between the channel area and the source-drain areas. This is because, with the capacitor in an electrically disconnected state, the electric charge is held. Thus, the driving frequency can be lowered. If the driving frequency is implemented at 1 Hz for example, the driving power can be reduced to about 1/60. In addition, it is possible to prevent the electric charge held in the pixel from leaking during the holding period. It is thus possible to prevent the pixel electric potential from decreasing after a fixed period of time. Therefore, it is possible to reduce flickering phenomena of the liquid-crystal display device. As a result, it is possible to implement a high-precision liquid-crystal display device consuming a small amount of power.

Figure 3:
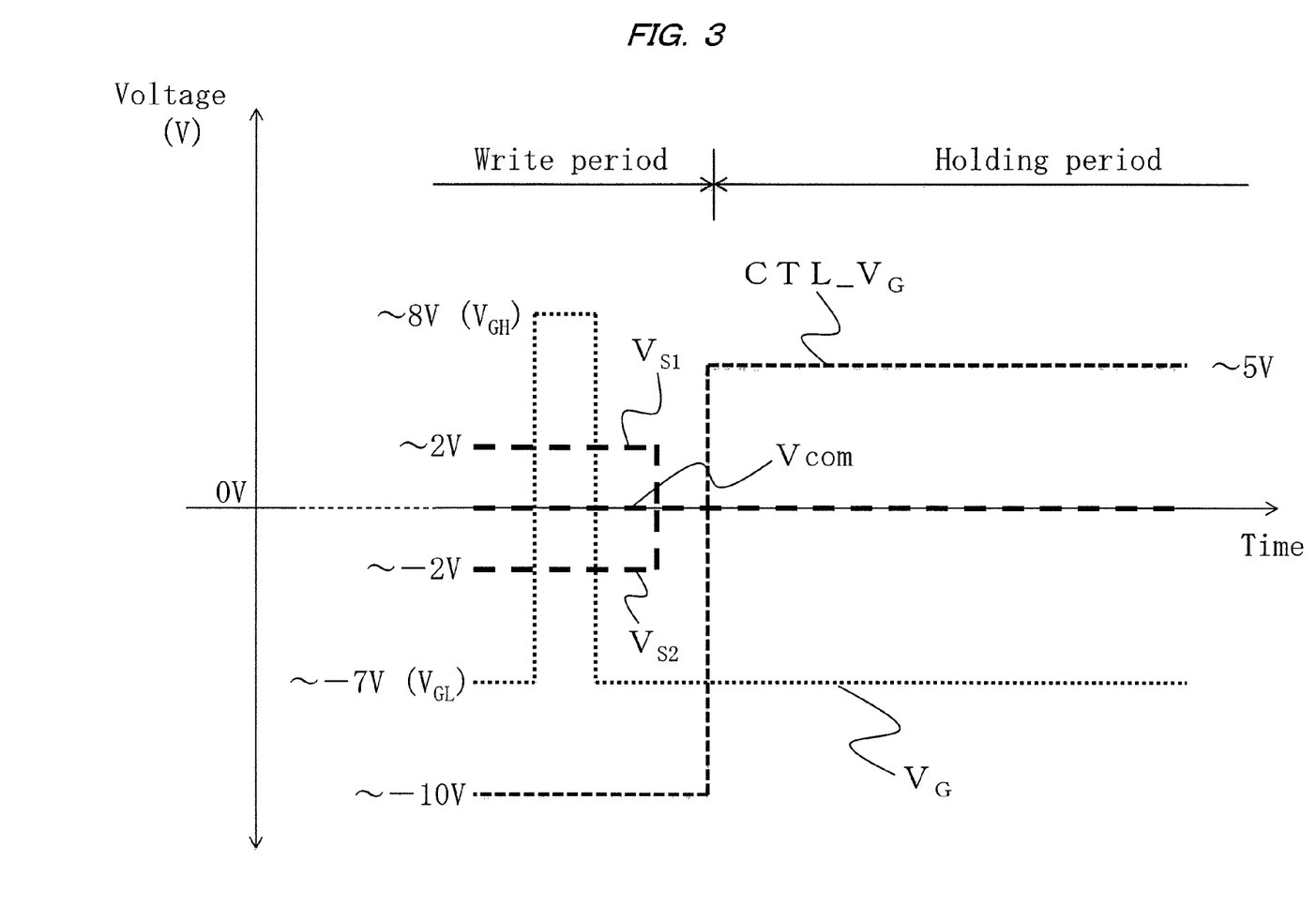
FIG. 3 is time chart schematically showing operations carried out by a display device according to an embodiment of the present invention.

FIG. 3 is time chart schematically showing the states of the A thin-film transistor 6 described above, a gate power supply $V_G$ and an opposite electrode electric potential or a common electric potential $V_{com}$. In a write period, the gate power supply $V_G$ rises from −7V ($V_{GL}$) to 8V ($V_{GH}$), accumulating electric charge in the pixel. At that time, the control gate power supply CTL_$V_G$ of the A thin-film transistor 6 is held at −10V whereas the A thin-film transistor 6 is put in a close state or an electrically connected state. Then, in a holding period, the control gate power supply CTL_$V_G$ of the A thin-film transistor 6 is raised to about 5V whereas the A thin-film transistor 6 is put in an open state or an electrically disconnected state in order to prevent the electric charge held in the pixel from being again accumulated in a gate-electrode/channel capacitor $C_{ch}$ through a resistor $R_{off}$ between the channel area and the source-drain areas.

In the liquid-crystal display device according to the embodiment, the substrate may be manufactured as a substrate created from the so-called LTPS-TFT (Low-Temperature-Poly-Silicon TFT). That is to say, the substrate is a low-temperature poly-silicon substrate created by carrying out a laser-anneal process for implementing a multi-crystallization process on an amorphous silicon film created on a glass substrate. Since the low-temperature silicon has a large off current, it has a big effect of reducing the leak current in accordance with the present invention. It is thus possible to reduce flickers of the liquid-crystal display device.

In addition, it is possible to use the liquid-crystal display device according to the embodiment as an intermittent-driving display device for periodically driving the first thin-film transistor. In the intermittent-driving display device, electric charge is discharged with ease during an idle period after an operation to accumulate the electric charge. Thus, the present invention serves as solution means effective for avoiding flickers of the liquid-crystal display device.

In addition, it is also possible to use the liquid-crystal display device according to the embodiment as an liquid-crystal display device adopting any of methods such as the following methods:

an FFS (Fringe Field Switching) method of driving liquid-crystal molecules by using a fringe field;

an IPS (In-Plant Switching) method of rotating liquid-crystal molecules in a plane parallel to a substrate and switching light by using a birefringence change;

a VA (Vertical Alignment) method of expressing a transparent state (white) and a non-transparent state (black) by using a birefringence which changes due to toppling of a liquid crystal with the liquid crystal oriented in the vertical direction in an initial state by applying a voltage thereto; and a TN (Twisted Nematic) method of a twisted nematic liquid crystal.

Particularly, in the liquid-crystal display device adopting the FFS method, the auxiliary capacitance $C_{st}$ is large. Thus, the effect of suppressing flickers in accordance with the present invention is large even though a leak current exists to a certain degree.

In addition, it is also possible to use the liquid-crystal display device according to the embodiment as the so-called OEL (Organic Electro Luminescence) liquid-crystal display device in which pixels are created by using an organic light emitting diode including an organic compound. Since a current change in a light emitting period affects the display, it is also capable of serving in an organic EL as means effective for suppressing flickers, reducing the power consumption and providing the liquid-crystal display device with high precision.

Second Embodiment

Figure 2:
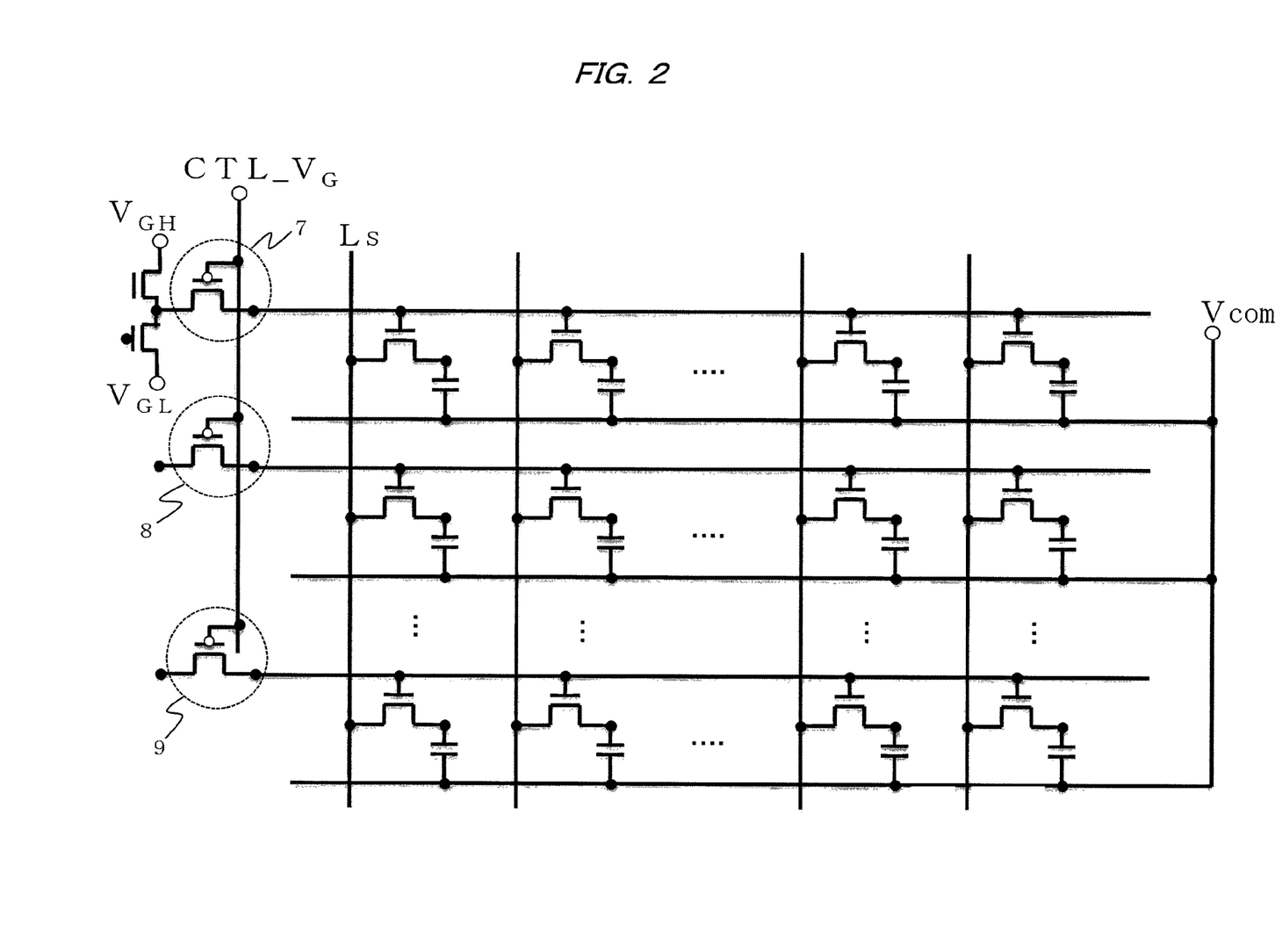
FIG. 2 is a diagram schematically showing a partial circuit configuration of a display device according to an embodiment of the present invention.

FIG. 2 shows another embodiment of the present invention. FIG. 2 is a diagram schematically showing a partial circuit configuration of a liquid-crystal display device according to the embodiment. This liquid-crystal display device is the so-called active-matrix liquid-crystal display device in which a pixel TFT is separately provided for each of pixels created to form a matrix on a substrate and, at any time other than a write time, the pixel TFT is put in an open state or an electrically disconnected state to hold display electric charge. In the same way as the pixels, a plurality of gate terminals for the pixels are laid out on the substrate to form a matrix. For each column, a gate terminal is connected to a gate line and a power supply section is connected to the end of the gate line. This power supply section is connected to a gate low voltage $V_{GL}$ and a gate high voltage $V_{GH}$ and has a structure allowing the voltages to be switched from one to another. Although the structure allowing the gate low voltage $V_{GL}$ and the gate high voltage $V_{GH}$ to be switched from one to another in this embodiment, it is possible to use a power supply section allowing a plurality of different voltages to be applied thereto, or use a power supply capable of supplying different voltages. In addition, the source-drain area of each of a plurality of pixel TFTs laid out to form a matrix is connected to a common electric potential line through capacitors comprising a liquid-crystal capacitor and an auxiliary capacitor, collected for each column and connected to a power supply section for supplying an opposite-electrode electric potential or the common electric potential $V_{com}$. In this embodiment, the gate terminals of a plurality of pixel TFTs laid out to form a matrix as described above are collected for each column and a B thin-film transistor 7, a C thin-film transistor 8 and a D thin-film transistor 9 are provided between a gate line to be connected and the power supply section for each gate line. By such a configuration, in a holding period after an operation to accumulate electric charge into the pixel or after a write operation, these B to D transistors are put in an open state or an electrically disconnected state so that it is possible to prevent the electric charge held in the pixel from being again accumulated in a gate-electrode/channel capacitor $C_{ch}$ in the holding period through a resistor $R_{off}$ between the channel area and the source-drain areas, in the same way as the first embodiment. Thus, it is possible to reduce the power consumption and provide the liquid-crystal display device with high precision. In this embodiment, the luminance change can be reduced to a value not greater than 1% even after a holding period of 1 second. Thus, a good intermittent driving characteristic can be obtained.

It is to be noted that, in the liquid-crystal display device according to the second embodiment, in the same way as the first embodiment, the substrate can be manufactured to serve as a substrate which is a low-temperature poly-silicon substrate created by carrying out a laser-anneal process for implementing a multi-crystallization process on an amorphous silicon film created on a glass substrate. In addition, in the same way, the liquid-crystal display device according to the second embodiment can be used as a liquid-crystal display device of the intermittent-driving type. Furthermore, the liquid-crystal display device according to the second embodiment can also be used as a liquid-crystal display device adopting any of methods such as the FSS method, the IPS method, the VA method and the TN method or as the so-called organic EL display device. Any of the liquid-crystal display devices implemented according to the second embodiment serves as means for reducing the power consumption and providing the liquid-crystal display device with high precision.

Third Embodiment

Figure 4:
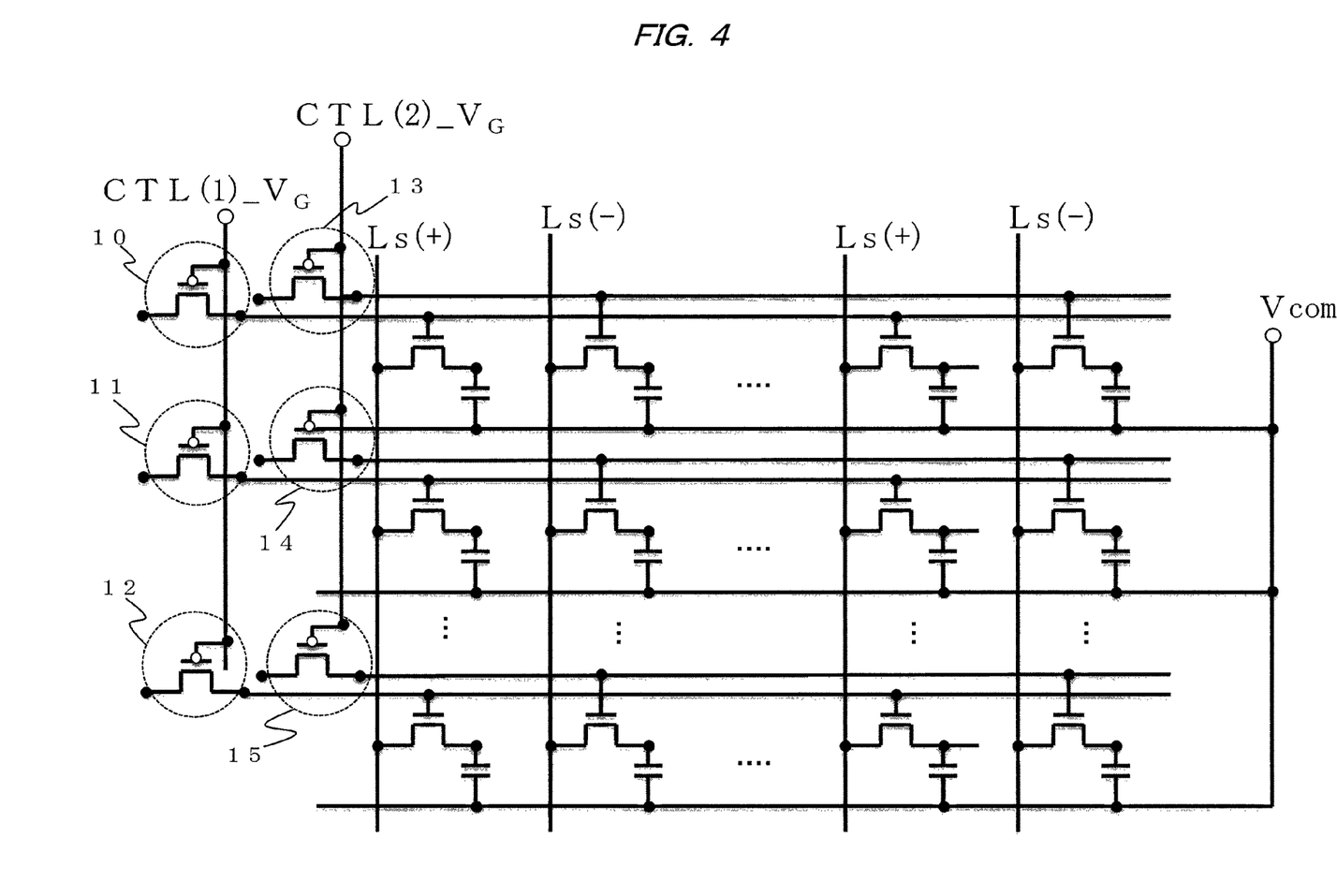
FIG. 4 is a diagram schematically showing a partial circuit configuration of a display device according to an embodiment of the present invention.

FIG. 4 shows another embodiment of the present invention. FIG. 4 is a diagram schematically showing a partial circuit configuration of a liquid-crystal display device according to the embodiment. In some cases, a smart phone or the like is required to implement the so-called column inversion driving. The column inversion driving is a driving method for reducing flickers by changing the sign of a write signal when changing the source line from an odd-numbered line to an even-number line or vice versa. In the column conversion driving, gate lines are bundled for each group of pixels having the same polarity in order to improve the holding characteristic. In this embodiment, as shown in FIG. 4, gate lines are bundled for each group of pixels having the same polarity and joined to each other in order to implement the column conversion driving. In addition, each group of gate lines bundled for each polarity is provided individually with E, F, G, H, I and J thin-film transistors denoted by reference numerals 10, 11, 12, 13, 14 and 15 respectively so that, in the same way as the first embodiment, it is possible to prevent the electric charge held in the pixel from being again accumulated in a gate-electrode/channel capacitor $C_{ch}$ in the holding period through a resistor $R_{off}$ between the channel area and the source-drain areas. Thus, it is possible to reduce the power consumption of the liquid-crystal display device and provide the liquid-crystal display device with high precision.

In an active-matrix liquid-crystal display device where pixels are laid out to form a matrix, leaking electric charge may move among a plurality of pixels. This is because, if the amount of electric charge accumulated in an individual pixel varies greatly from pixel to pixel, electric charge moves easily among the pixels. To solve this problem, as implemented in the configuration of this embodiment, gate lines are bundled separately for the plus polarity and the minus polarity. In this way, the electric-charge holding characteristic or each pixel can be improved. In such a configuration, however, each row requires two gate lines so that this liquid-crystal display device has a demerit that the aperture rate of the display device is decreased.

It is to be noted that, in the liquid-crystal display device according to the third embodiment, in the same way as the first embodiment, the substrate can be manufactured to serve as a substrate which is a low-temperature poly-silicon substrate created by carrying out a laser-anneal process for implementing a multi-crystallization process on an amorphous silicon film created on a glass substrate. In addition, in the same way, the liquid-crystal display device according to the third embodiment can be used as a liquid-crystal display device of the intermittent-driving type. Furthermore, the liquid-crystal display device according to the third embodiment can also be used as a liquid-crystal display device adopting any of methods such as the FSS method, the IPS method, the VA method and the TN method or as the so-called organic EL display device. Any of the liquid-crystal display devices implemented according to the third embodiment serves as means for reducing the power consumption and providing the liquid-crystal display device with high precision.

Each of the embodiments described above is a typical implementation wherein, in a holding period after electric charge has been accumulated in the pixel or after a write operation has been carried out, the gate line or the gate power supply is put in an open state or an electrically disconnected state in order to prevent changes of the gate capacitance. Principally, however, the same effect can be obtained by carrying out the state operation on the source line. If the source line is also put in an open state during the holding period, an even better effect can be obtained.

In addition, each embodiment described above mainly implements a liquid-crystal display device serving as an application example. However, the embodiments can each implement another application such as a flat-panel display device. Examples of the flat-panel display device include an organic EL display device, another self light emitting display device, and an electronic paper display device having an electro-morph element or the like. In addition, the embodiments can each implement a display device not limited to a particular size, ranging from small/medium to large.

What is claimed is:

1. A display device comprising:
   a first source power supply group for providing pixel electric potentials, through a plurality of first thin-film transistors, to a first pixel group of pixels laid out on a substrate with a fixed gap;
   a second source power supply group for providing electric potentials having a polarity different from the pixel electric potentials, through a plurality of second thin-film transistors, to a second pixel group of pixels laid out on the substrate in an area different from the first pixel group with a fixed gap;
   a first gate power supply group for controlling conductive and nonconductive states of the first thin-film transistors;
   a second gate power supply group for controlling conductive and nonconductive states of the second thin-film transistors;
   a third thin-film transistor disposed between the first thin-film transistors and the first gate power supply, the third thin-film transistor being controllable independently; and
   a fourth thin-film transistor disposed between the second thin-film transistors and the second gate power supply, the fourth thin-film transistor being controllable independently.

2. A display device according to claim 1, wherein the substrate is a low-temperature poly-silicon substrate created by carrying out a laser-anneal process for implementing a multi-crystallization process on an amorphous silicon film formed on a glass substrate.

3. A display device according to claim 1, wherein the first thin-film transistor is driven periodically so that the display device functions as a display device of an intermittent driving type with a period comprising a write period for writing data into any of the pixels and a holding period for holding an electric potential of the pixel.

4. A display device according to claim 1, the display device being a liquid-crystal display device adopting an FFS (Fringe Field Switching) method of driving liquid-crystal molecules by using a fringe field.

5. A display device according to claim 1, the display device being an organic light emitting diode including an organic compound.

* * * * *